Sept. 29, 1964   G. R. REID ETAL   3,151,211
MEANS FOR CONNECTING COAXIAL CABLES
Filed Aug. 4, 1961   2 Sheets-Sheet 1
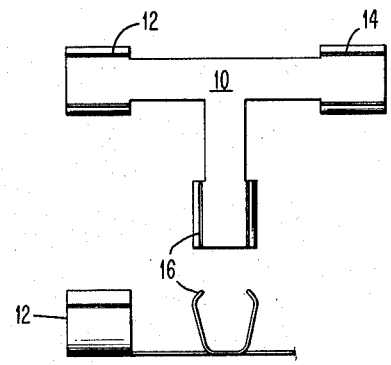
FIG. 1a
FIG. 1b
FIG. 1c
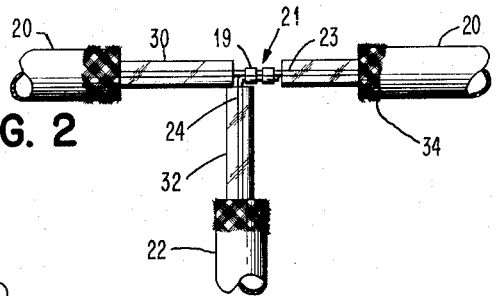
FIG. 2
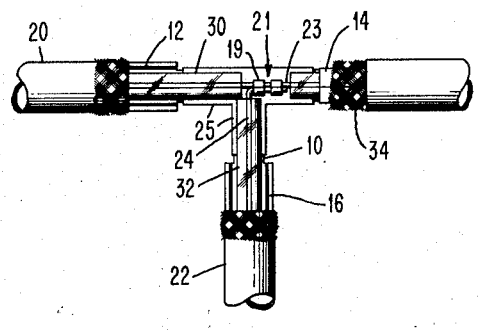
FIG. 3
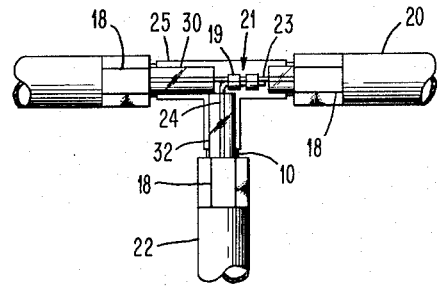
FIG. 4
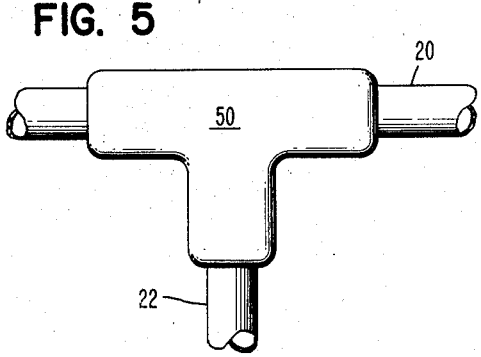
FIG. 5
INVENTORS
GILBERT R. REID
JACOB MUELLER
BY
ATTORNEY

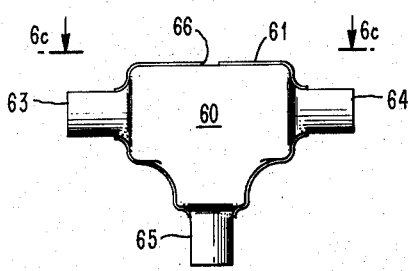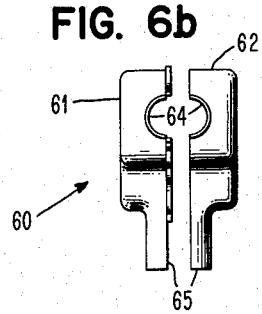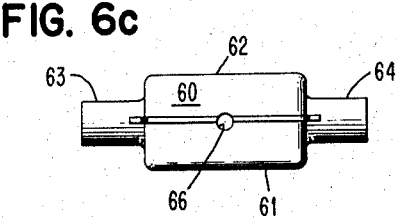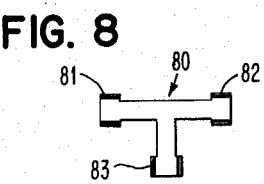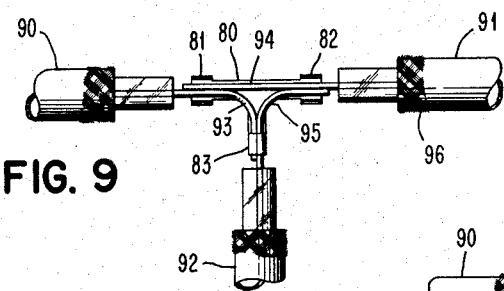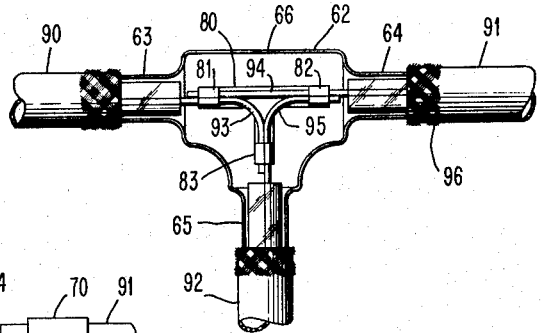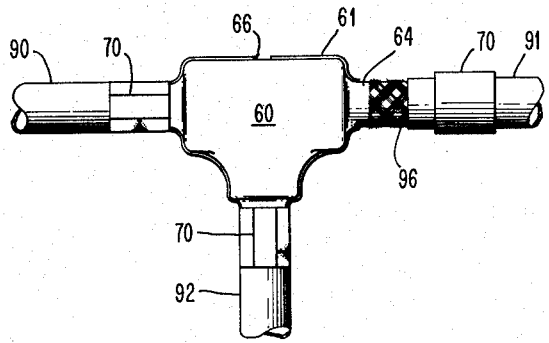

United States Patent Office 3,151,211
Patented Sept. 29, 1964

3,151,211
MEANS FOR CONNECTING COAXIAL CABLES
Gilbert R. Reid, Camden, N.J., and Jacob Mueller, Philadelphia, Pa., assignors to Sperry Rand Corporation, New York, N.Y., a corporation of Delaware
Filed Aug. 4, 1961, Ser. No. 129,462
8 Claims. (Cl. 174—72)

This invention relates to methods and means for connecting coaxial cables together.

Coaxial cables, which are used extensively in the electrical and electronic industries, generally comprise an inner conductor, a dielectric surrounding the inner conductor, and an external concentric conductor covering the dielectric. The external conductor may or may not be covered by an insulating sheath. For certain applications, more than one inner conductor can be used. For various electrical purposes, it is desired to connect one coaxial cable to another one or to several coaxial cables.

In the past, coaxial cable connections were performed, using relatively expensive connectors and generally involved adapting a cable with either a male plug or female receptacle, which was permanently attached thereto, so that the cable could be subsequently connected to another cable. These connectors, using male and female components, were desirable because they provided strength and rigidity in their mating connections. However, the specially adapted male and female connectors, which are known as temporary connectors because they could be easily mated or disengaged, are usually expensive, due in part, because these connectors were prepared by soldering.

Various problems existed with connectors of the prior art. These problems included intermittent grounds caused by unreliable ground connections; interference of proper conductor connections by spurious solder; and destroying of adjacent insulation by excessive temperature during soldering.

Furthermore, conventional connecting devices have heretofore been comparatively expensive.

Therefore, it is an object of this invention to provide a permanent connector which is relatively simple and inexpensive to prepare.

Another object of this invention is to provide a novel method for connecting two or more coaxial cables together.

Still another object of this invention is to provide a new means and a new method for permanently and inexpensively joining a plurality of coaxial cables together.

In accordance with one embodiment of this invention, one coaxial cable is connected or tapped to a second coaxial cable. The one coaxial cable is dressed at one end in a customary manner. The other coaxial cable is prepared for tapping by having a central portion thereof dressed (or stripped) so as to bear its inner conductor. The inner conductors of the two cables are joined together by a conductive crimping means. The dielectric of each cable is joined together by an external shield. The strands of the external conductors of the cables are combed over a portion of the external shield, so that by crimping a conductive ring over the external conductor and shield, an excellent mechanical and electrical connection is made between the external shield and the external conductor.

In still another embodiment of this invention, three coaxial cables are coupled together wherein the inner conductors are clamped by means of a T connector whereby the ends of the T connector crimp a pair of wires together so that the three inner conductors are physically joined together. The dielectric of the three cables is held firm by an external shield. The external shield, when partly covered by the external conductor and by crimping conductive rings, provide a conducting path for the external conductors. The inner recesses of the connection can be filled with a dielectric to provide for matching of characteristic impedances.

Other objects and advantages, together with its construction and method of operation, will become more apparent from the following description, when read in connection with the accompanying drawings, in which:

FIG. 1a is an illustration of an external T piece used in one embodiment of this invention;

FIG. 1b is an illustration of a cylindrical ring used in accordance with this invention;

FIG. 1c is an illustration of a pair of U connectors used in accordance with this invention;

FIG. 2 is an illustration which shows a pair of coaxial cables with the inner conductors joined together by a pair of U pieces;

FIG. 3 is an illustration which shows the dielectrics of the cables of FIG. 2 joined together by the connector of FIG. 1a;

FIG. 4 is an illustration which shows the external conductors of the cables of FIG. 3 joined together with the connector of FIG. 1a by means of crimped conductive rings shown in FIG. 1b;

FIG. 5 is an illustration which shows the cables of FIG. 4 in a finished mold;

FIGS. 6a, 6b, and 6c are three views of another embodiment of an external shield for use in practising this invention;

FIG. 7 shows an external conductive ring adapted to mate with the shield of FIG. 6;

FIG. 8 is a drawing of a T connector for connecting the inner conductors of the coaxial cables together, in a manner as shown in FIG. 9;

FIG. 10 is a drawing which shows the three coaxial cables with the inner conductors connected together, as shown in FIG. 9, together with the external shield of FIG. 6; and FIG. 11 shows the external shield and cables of FIG. 10 joined together by crimping rings of FIG. 7.

The T piece 10, as shown in FIG. 1a, is made from a blank of suitable conducting material which may be, for example, hard brass, which is stamped into a T configuration and then shaped into the form as shown in FIG. 1a. The ends 12, 14 and 16 are raised from the base of the T, as shown in the drawing, to form ferrules.

The conductive ring 18, as shown in FIG. 1b, and the U pieces 19, as shown in FIG. 1c, are made of conductive material, for example, half-hard brass.

The following describes the connection of one coaxial cable to a tap on another coaxial cable. Referring to FIG. 2, a coaxial cable 20 is stripped and dressed in preparation for splicing at a tap 21. A coaxial cable 22 is stripped and dressed at one end thereof, in preparation for the connection to the cable 20. The center conductor 24 of the cable 22 is initially bent at a 90° angle. The connector 24 of the cable 22 and the center conductor 23 of the cable 20 are then brought into juxtaposition at their bared conductor portions at the tap 21 and joined together by a pair of U pieces 19. The U pieces 19 are crimped, by a suitable crimping tool, to physically and electrically join the inner conductors 23 and 24 together.

The coaxial cables 20 and 22 are then inserted into the formed T connector 10, as shown in FIG. 3. The T connector 10 encompasses the dielectric of the cables 20 and 22. The dielectric 30 of the cable 20 rests at the top of the connector 10, and meets with the connector 10 at the left end 12 and the right end 14. The dielectric 32 of the cable 22 rests in the end 16 of the connector 10.

After inserting the cables with their inner conductors joined together, as shown in FIG. 2, into the T connector 10, the ends 12, 14, 16 are crimped, by a crimping tool, about the dielectric 30 and 32 of the cables 20 and 22, respectively, as shown, for example, by the end 14 of FIG. 3. The external braid 34 of the cables 20, 22 are then combed over the crimped T connector, as shown, for example, by the braid 34 of the cable 20, which is combed over the end 14 of the T connector 10.

The conductive rings 18, which were initially slipped on the cables 20 and 22, are brought over the braid covered ends 12, 14, 16 of the T connector 10 and crimped by a crimping tool as shown in FIG. 4.

The inner conductors 23, 24 of the cables 20, 22 are, therefore, physically and electrically joined; the dielectric 30, 32 of the cables 20, 22 are physically joined; the external conductors (braid 34) are physically and electrically joined. The entire connection is subsequently "fixed" by a mold 50, as shown in FIG. 5. (The mold can be rubber or suitable plastic material to derive desired matching of characteristic impedance.)

As shown in FIGS. 2 through 5, the cable 22 can be coupled to a tap of the cable 20 by stripping and dressing both cables in preparation for splicing, connecting the center connectors together by means of a crimped conductive U piece (or pair of crimped U pieces), rigidly coupling the dielectrics 30 and 32 together by means of the external shield such as the T piece 10, by crimping the ends of the T piece 10 at the ends 12, 14, and 16, combining the external braid 34 over the ends of the T piece (such as the end 14), and by crimping conductive rings 18 over the combed braid 34 to provide for a positive electrical and physical connection. The entire assembly is then molded in a suitable plastic as shown in FIG. 5 to provide for proper characteristic impedance.

Similar connections can be made with three cables as described hereinafter. Other variations may be used as, for example, the external shield shown in FIGS. 6a, 6b and 6c, in lieu of an external T connector shown in FIG. 1a. An external conducting shield 60 is shown in FIGS. 6a, 6b, and 6c which shows a side view, a two-piece end view and a top view, respectively. The conducting shield 60 comprises a pair of mating pieces 61 and 62. The shield 60, when mated, includes three outer sleeves 63, 64, 65 whose axes form the shape of a T, the outer sleeve 63 being co-axial with the sleeve 64, the sleeve 65 being at the base of the T. An orifice 66 is provided at the top of the shield 60 for the insertion of a dielectric.

FIG. 7 shows a view of a conductive ring 70 similar to the type shown in FIG. 1b. FIG. 8 shows a view of a T connector 80 similar in shape to that shown in FIG. 1a, but substantially smaller in size. Cables 90, 91 and 92 are initially prepared by having their ends dressed. The center conductors 93, 94 and 95 of the cables 90, 91 and 92, respectively, are inserted into the T connector 80, as shown in FIG. 9. The ends 81, 82 and 83 of the T connector 80 are crimped about the inner conductors of the cables so that the end 81 firmly crimps together the conductors 93 and 94; the end 82 firmly crimps together the inner conductors 94, 95 and the end 83 firmly crimps together the inner conductors 93, 95. The three cables 90, 91, and 92 are inserted onto the shield portion 62 as shown in FIG. 10. The sleeves 63, 64, 65 of the shield portion 62 contact the dielectric portions of the cables 90, 91 and 92.

The mating shield portion 61 is inserted above the shield portion 62 as shown in FIG. 11. The braid 96 of the cable 91 and the braid of the other cables 90, 92 are combed over the mated shield 60. The conductive rings 70 are inserted over the combed braid 96 at the sleeve ends of the shield 60 and crimped together by means of the crimping tool.

A suitable dielectric is inserted through the orifice 66 to provide for desired characteristic impedance.

Various modifications will be apparent to those skilled in the art. It is desired, however, that this invention be limited solely by the scope of the appended claims.

One modification which is apparent is a substitution of split rings in lieu of the conductive rings 18 or 70. By the use of split rings, the T connection can be performed without disconnecting or disturbing other electrical connections previously made on the cable. Thus, the split rings fill the need for "on the spot" modifications as they occur. Therefore, the terminology "conductive rings," as used in the claims, includes both whole and split rings.

Still another modification is an equivalent shape to the T connector. It is obvious, for example, that Y connectors can be used with similar results. The use of the term "T connector" in the claims includes such variations as a Y connector.

Suitable dielectric material which can be used include, but not necessarily limited thereto, epoxy resins, polyurethane, and polyethylene. These dielectrics, when in their hardened state, can be solid or foamed, depending upon their dielectric properties and the desired characteristic impedance.

What is claimed is:

1. In combination, a first coaxial cable and a second coaxial cable, each of said cables having an inner conductor, an external concentric conductor, and a dielectric separating said conductors; a first crimped conductive means solderlessly, mechanically, and electrically joining said inner conductors together; a second crimped conductive means mechanically joining said separating dielectrics together; and crimped conductive rings, one of said rings solderlessly, mechanically, and electrically joining said first external conductor to said second conductive means, and another one of said rings solderlessly, mechanically, and electrically joining said second external conductor to said second conductive means.

2. The combination as claimed in claim 1 wherein said second conducting means is a T-shaped connector.

3. In combination, three coaxial cables, each of said cables having an inner conductor, an external concentric conductor, and a dielectric separating said conductors; a first crimped conductive means solderlessly, mechanically, and electrically joining said inner conductors together; a second crimped conductive means mechanically joining said separating dielectrics together; and three crimped conductive rings, each of said rings associated with a different cable, each one of said rings solderlessly, mechanically, and electrically joining said external conductor of its respective coaxial cable to said second conductive means.

4. The combination as claimed in claim 3 wherein said first conductive means is a T-shaped connector.

5. In combination, a first coaxial cable and a second coaxial cable, each of said cables having an inner conductor, an external concentric conductor, and a dielectric separating said conductors; a first crimped conductor means solderlessly, mechanically, and electrically joining said inner conductors together; a second crimped conductor means comprising an integral multi-terminated member including a ferrule at each terminal for mechanically joining said separating dielectrics together, each of said separating dielectrics being joined by one said ferrule; and crimped conductive rings, one of said rings solderlessly, mechanically, and electrically joining said first external conductor to said second conductive means, and another one of said rings solderlessly, mechanically, and electrically joining said second external conductor to said second conductive means.

6. In combination, a first coaxial cable and a second coaxial cable, each of said cables having an inner conductor, an external concentric conductor, and a dielectric separating said conductors; a first crimped conductive means solderlessly, mechanically, and electrically joining the end of the inner conductor of said first coaxial cable with a tap of the inner conductor of said second coaxial cable; a second crimped conductive means comprising an integral T-shaped three-terminal member including a ferrule at each of said terminals, one of said ferrules being crimped about said separating dielectric of said first coaxial cable and the other two ferrules being crimped, one at each side of said tap, about said separating dielectric of said second coaxial cable; and crimped conductive rings, one of said rings solderlessly, mechanically, and electrically joining said first external conductor to said second conductive means, and another of said rings solderlessly, mechanically, and electrically joining said second external conductor to said second conductive means.

7. In combination, three coaxial cables, each of said cables having an inner conductor, an external concentric conductor, and a dielectric separating said conductors; a first crimped conductive means solderlessly, mechanically, and electrically joining said inner conductors together; a second crimped conductive means comprising an integral T-shaped three-terminal member including a ferrule at each of said terminals mechanically joining said separating dielectrics together, each of said separating dielectrics being joined by a respective one of said ferrules; and three crimped conductive rings, each of said rings associated with a different cable, each one of said rings solderlessly, mechanically, and electrically joining said external conductor of its respective coaxial cable to said second conductive means.

8. A combination as claimed in claim 7 wherein said first conductor means is a T-shaped connector.

References Cited in the file of this patent

UNITED STATES PATENTS

| | | |
|---|---|---|
| 288,311 | Cobb | Nov. 13, 1883 |
| 2,305,473 | Hayford | Dec. 15, 1942 |
| 2,536,003 | Dupre | Dec. 26, 1950 |

FOREIGN PATENTS

| | | |
|---|---|---|
| 125,496 | Australia | Oct. 2, 1947 |